(12) United States Patent
Burke

(10) Patent No.: US 8,689,975 B2
(45) Date of Patent: Apr. 8, 2014

(54) BULK WIRE ISOLATOR APPARATUS

(75) Inventor: Mark Burke, Etobicoke (CA)

(73) Assignee: Lincoln Global, Inc., City of Industry, CA (US)

( * ) Notice: Subject to any disclaimer, the term of this patent is extended or adjusted under 35 U.S.C. 154(b) by 165 days.

(21) Appl. No.: 13/171,961

(22) Filed: Jun. 29, 2011

(65) Prior Publication Data

US 2013/0001238 A1    Jan. 3, 2013

(51) Int. Cl.
*B65D 85/66*     (2006.01)

(52) U.S. Cl.
USPC .................. 206/409; 242/171; 242/615.2

(58) Field of Classification Search
USPC ............ 206/389, 408, 409; 226/170, 171;
242/170–175, 129, 566, 588.3, 588.6, 242/590, 615.2, 615.3
See application file for complete search history.

(56) References Cited

U.S. PATENT DOCUMENTS

| | | | | |
|---|---|---|---|---|
| 3,491,876 | A | * | 1/1970 | Zecchin ........................ 206/408 |
| 3,536,239 | A | | 10/1970 | Strong |
| 3,567,900 | A | | 3/1971 | Nelson et al. |
| 4,160,151 | A | | 7/1979 | Tonita |
| 4,179,056 | A | * | 12/1979 | Schmerling ................... 226/171 |
| 5,123,607 | A | | 6/1992 | Jones |
| 5,374,005 | A | * | 12/1994 | Jenkins et al. ................ 242/171 |
| 6,610,958 | B2 | | 8/2003 | Stricklen |
| 6,715,608 | B1 | * | 4/2004 | Moore ........................... 206/409 |
| 7,390,989 | B2 | | 6/2008 | Matiash et al. |
| 7,866,586 | B2 | * | 1/2011 | Fabian ........................... 242/171 |
| 2007/0051716 | A1 | * | 3/2007 | Hartman et al. .......... 219/145.22 |
| 2009/0274540 | A1 | | 11/2009 | Batchelder et al. |
| 2010/0044408 | A1 | * | 2/2010 | Kaufhold et al. .............. 226/170 |

FOREIGN PATENT DOCUMENTS

| | | |
|---|---|---|
| BE | 560317 | 8/1957 |
| EP | 0803310 A1 | 10/1997 |
| JP | 54121369 A | 9/1979 |

OTHER PUBLICATIONS

Accessories for bulk packs, Feb. 22, 2011, 3 pages, http://www.migweld.de/no_cache/english/products/accessories/accessories-for-bulk-packs.html?sword_list%5B0%5=pulley.
International Search Report for corresponding application PCT/IB2012/001297 dated Oct. 25, 2012.
Written Opinion of the ISA for corresponding application PCT/IB2012/001297 dated Oct. 25, 2012.

* cited by examiner

*Primary Examiner* — Luan K Bui
(74) *Attorney, Agent, or Firm* — Hahn Loeser & Parks LLP

(57) ABSTRACT

An apparatus includes a bulk wire container comprising coiled wire and an isolator. The isolator includes an attachment means to said bulk wire container, an inlet, an outlet, and a wire engaging means. The wire engaging means translates longitudinal axial movement of the wire in the inlet into circumferential tangential movement about the wire engaging means.

8 Claims, 8 Drawing Sheets

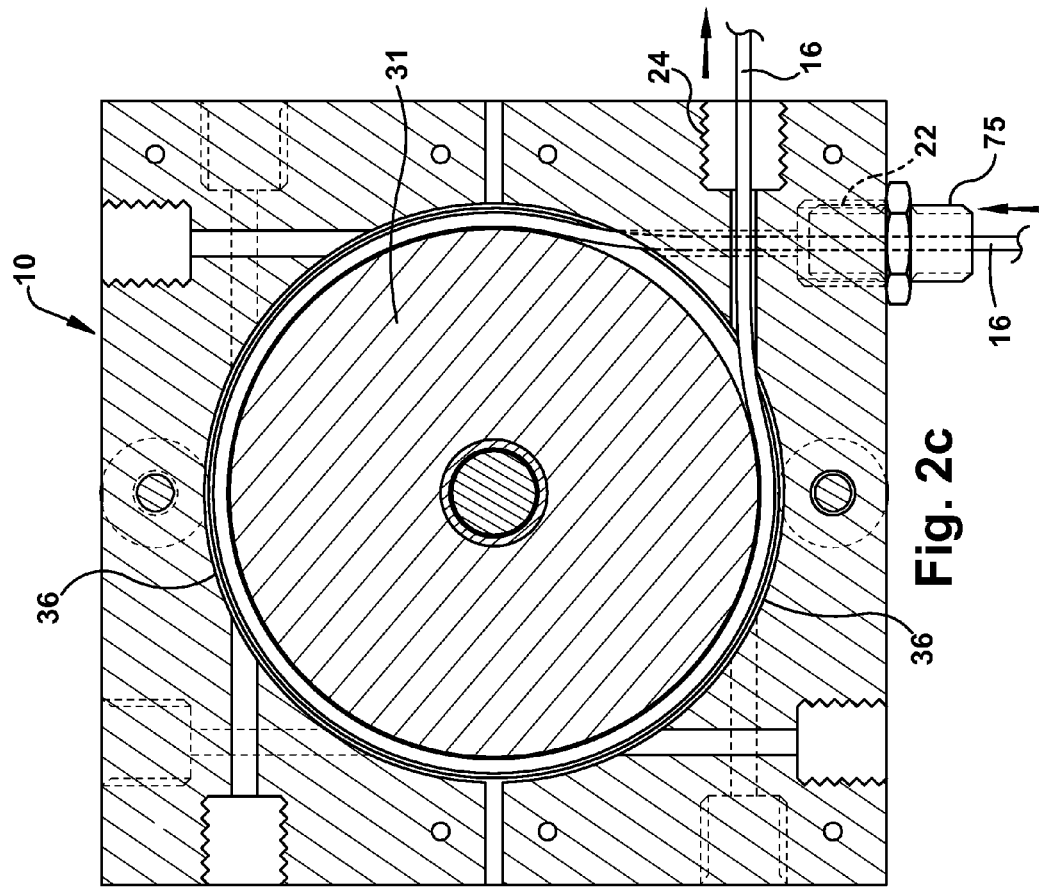
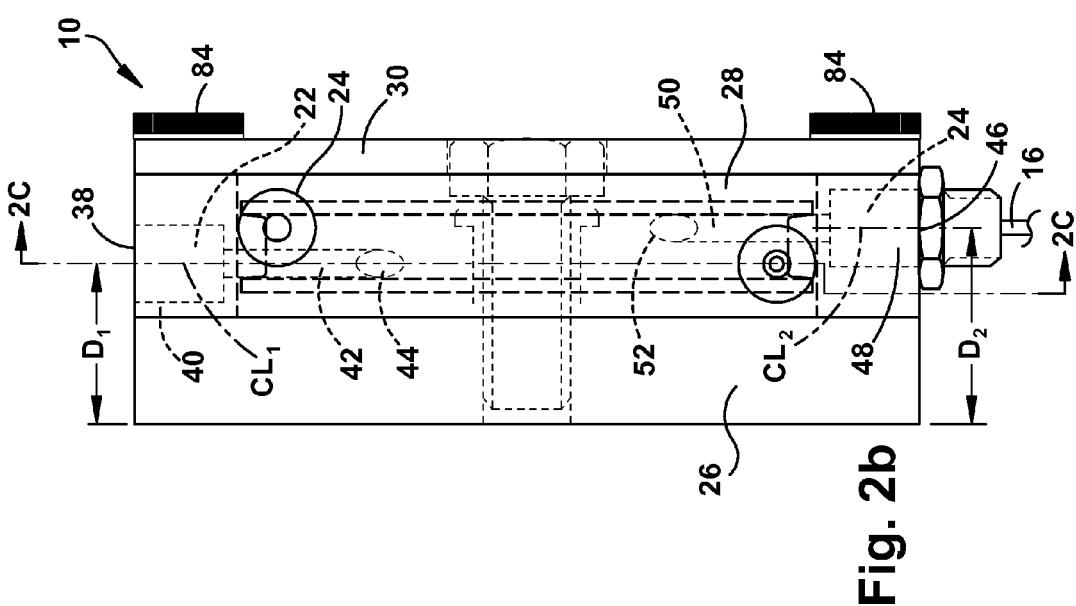

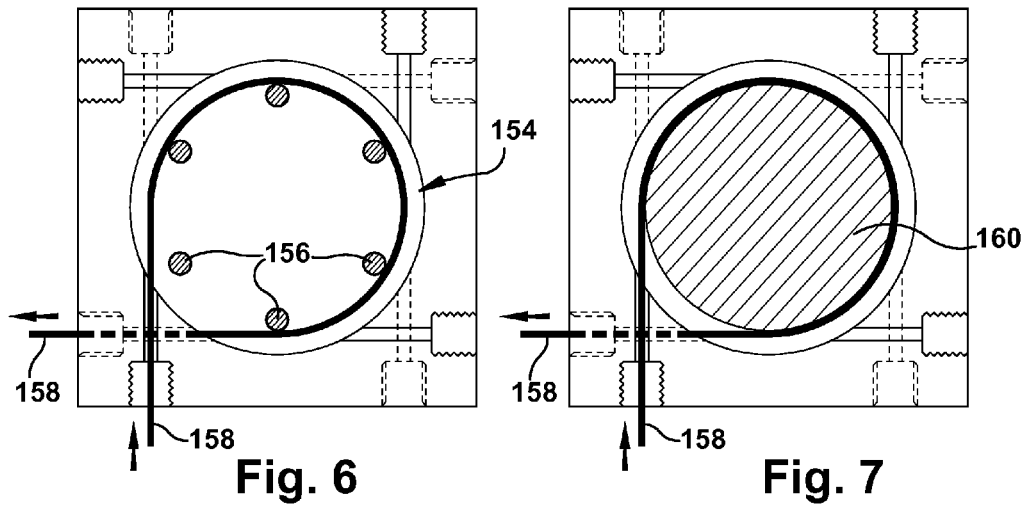
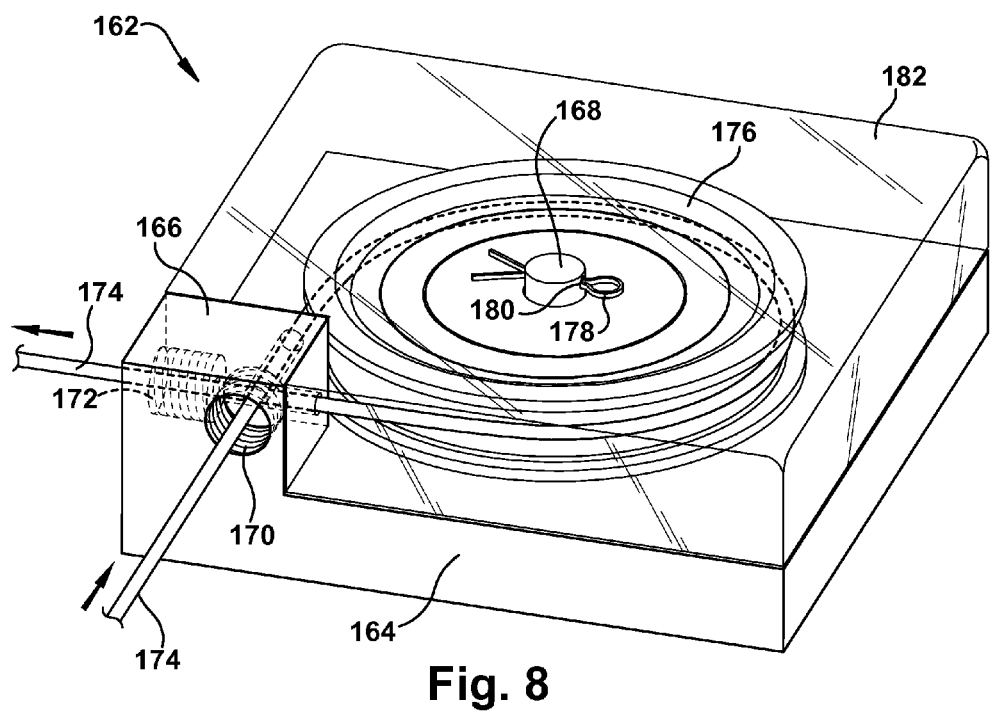

US 8,689,975 B2

BULK WIRE ISOLATOR APPARATUS

TECHNICAL FIELD

The invention described herein relates generally to wire isolators for bulk welding wire containers and a method of using the same.

BACKGROUND OF THE DISCLOSURE

Welding applications which require large quantities of welding wire necessitate welding wire packages which contain large quantities of a continuous welding wire. As a result, large welding wire packages have been created for these applications which allow for a significant amount of welding run time before the operation must be shut down to swap the used package for a new package of welding wire. This is particularly important for automated or semi-automated welding operations.

Bulk packaging of welding wire is gaining popularity in both automated and semi-automated welding applications due to the reduced down time necessary to change and restring a new package of welding wire. Further, it is important to have reliable wire payout or dispensing from the welding wire package without wire tangling or wire flip/wander. Each tangle can potentially shut down an entire manufacturing line and reduces production yield. In this respect, in order to work in connection with the wire feeder of the welder, the welding wire must be dispensed in a non-twisted, non-distorted and non-canted condition which produces a more uniform weld without human attention.

Drum or box wire packages have been developed which protect the welding wire from the manufacturing environment and which can be disposed of at a lesser cost. The welding wire is coiled, looped, or spun into the drum or box package in a loosely wound wire stack or coil consisting of many convolutions of wire which are often not as structurally stable as the wire convolutions of other wire packages, a reeled wire for example. In addition, twisting that originates from the wire feeder can transmit to the bulk wire package and/or restrictions in the feed path prevent natural unwinding of the wire from the box, both may increase tangling. Therefore, it is important to control the wire within the package in addition to the payout of the wire from the package in order to reduce twisting, tangling or canting of the welding wire. This condition is worsened with larger welding wire packages which are preferred in automated or semi-automated welding operations. Furthermore, abuse during shipping and handling of the soft drum or box container often disrupts the uniform spacing or stacking of each convolution in the wire stack, increasing tangling potential.

In view of the foregoing problems and shortcomings of removal or payout of welding wire from bulk welding wire containers, the present application describes bulk wire dampers to overcome these shortcomings.

SUMMARY OF THE DISCLOSURE

In accordance with the present invention, there is provided an apparatus that includes a bulk wire container comprising coiled wire and a wire isolator. The wire isolator includes an attachment means to said bulk wire container, an inlet, an outlet, and a wire engaging means. The wire engaging means translates longitudinal axial movement of the wire in the inlet into circumferential tangential movement about the wire engaging means, interposed between the inlet and the outlet.

Also within the scope of the invention is an assembly comprising a bulk wire container including coiled wire and at least one isolator. The at least one isolator includes an attachment means, a lower housing, an inlet, an outlet, and a wire engaging means. The wire engaging means circumferentially translates the wire from the inlet to the outlet and the wire engaging means connects to the lower housing Also within the scope of the invention is another wire isolator for use with a container having bulk welding wire. The wire isolator includes an attachment means, a lower housing having a bottom surface, an inlet having a first central longitudinal axis, and outlet having a second central longitudinal axis, and a pulley which circumferentially translates the wire between the inlet and the outlet.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 2b is a side view of the wire isolator illustrated in FIG. 2a;

FIG. 2c is a cross-sectional view of the wire isolator illustrated in FIGS. 2a-2b taken along line 2c-2c shown in FIG. 2b;

FIG. 3 is an exploded assembly view of the wire isolator illustrated in FIG. 2a;

FIG. 6 is a top plan view of a wire isolator having a roller bearing assembly;

FIG. 7 is a top plan view of a wire isolator having a fixed circular shaft;

FIG. 8 is a perspective view of an alternative wire isolator; and

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
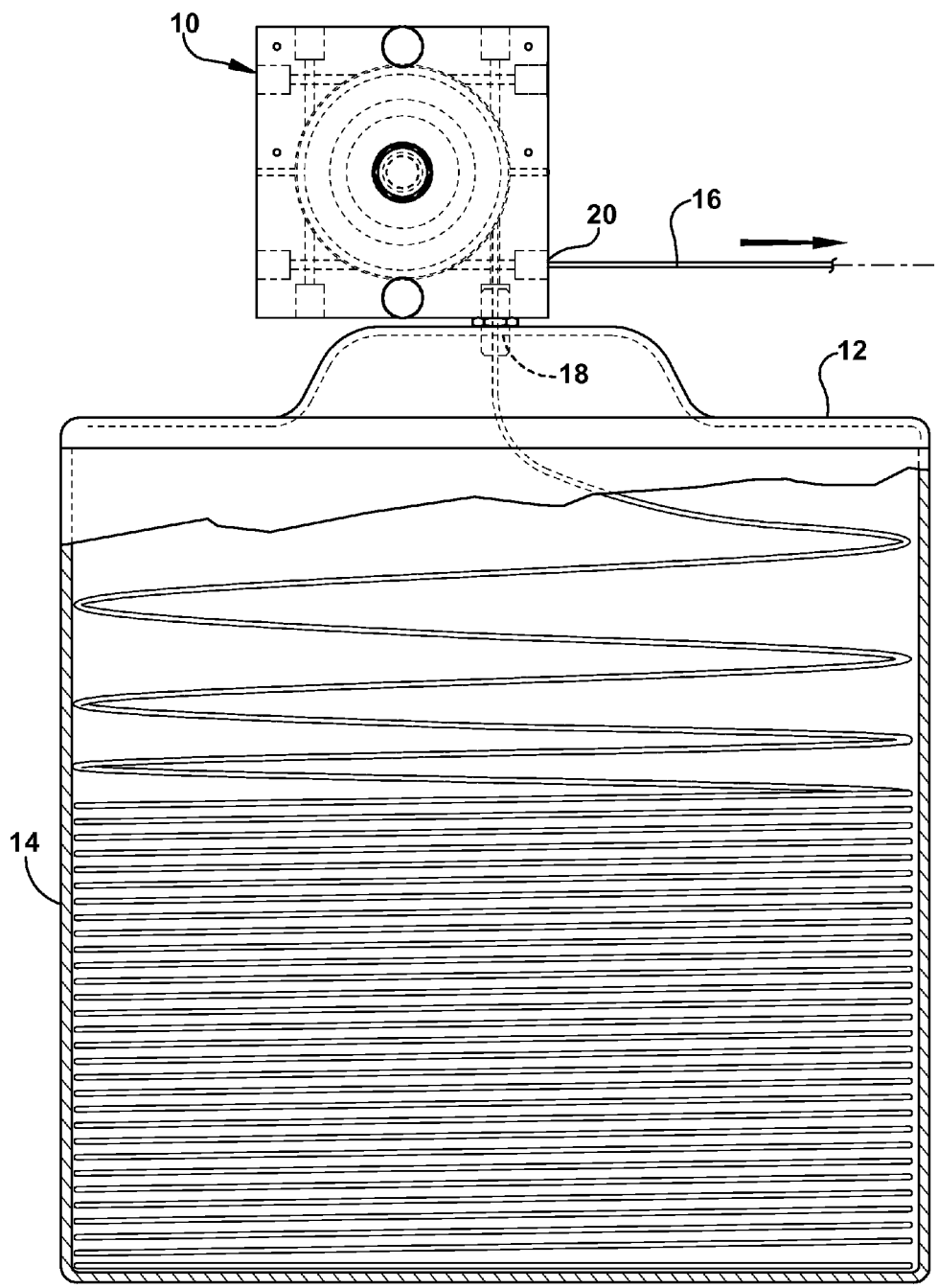
FIG. 1 is a side elevational view in partial cross-section of a bulk wire container having an attached wire isolator.

Referring now to the drawings wherein the showings are for purposes of illustrating the preferred embodiment of the invention only and not for purposes of limiting the same, as illustrated in FIG. 1, wire isolator 10 attaches to a dome shaped cover 12 on a drum or box bulk wire container 14 containing welding wire (the cover and the container are not drawn to scale). Welding wire 16 is shown exiting bulk wire container 14 through wire isolator 10, feeding a wire pulling apparatus to supply a welding system (both not shown). The process of pulling welding wire out of a bulk wire container is known as payoff. In the illustrated embodiment, wire isolator 10 attaches to a top portion of cover 12 so that welding wire enters an inlet aperture side 18 and exits an outlet aperture side 20. In this embodiment, wire isolator 10 attaches to the top of the bulk wire container or to another side of the bulk wire container. In another embodiment, more than one wire isolator attaches to the cover (inside or outside), the bulk wire container, or some other location in a welding wire system. In yet another embodiment, the wire isolator attaches to a welding wire feeder. In another embodiment, the wire isolator attaches to the cover or the bulk wire container and a wire straightening device is connected to the welding wire feeder. In yet another embodiment, the wire isolator is motorized and/or includes a control system that includes at least one of the following sensors: motion, torque, and rotational speed. In another embodiment, the wire isolator includes a camera system that connects to a computer system that can be monitored by an operator.

Figure 2A:
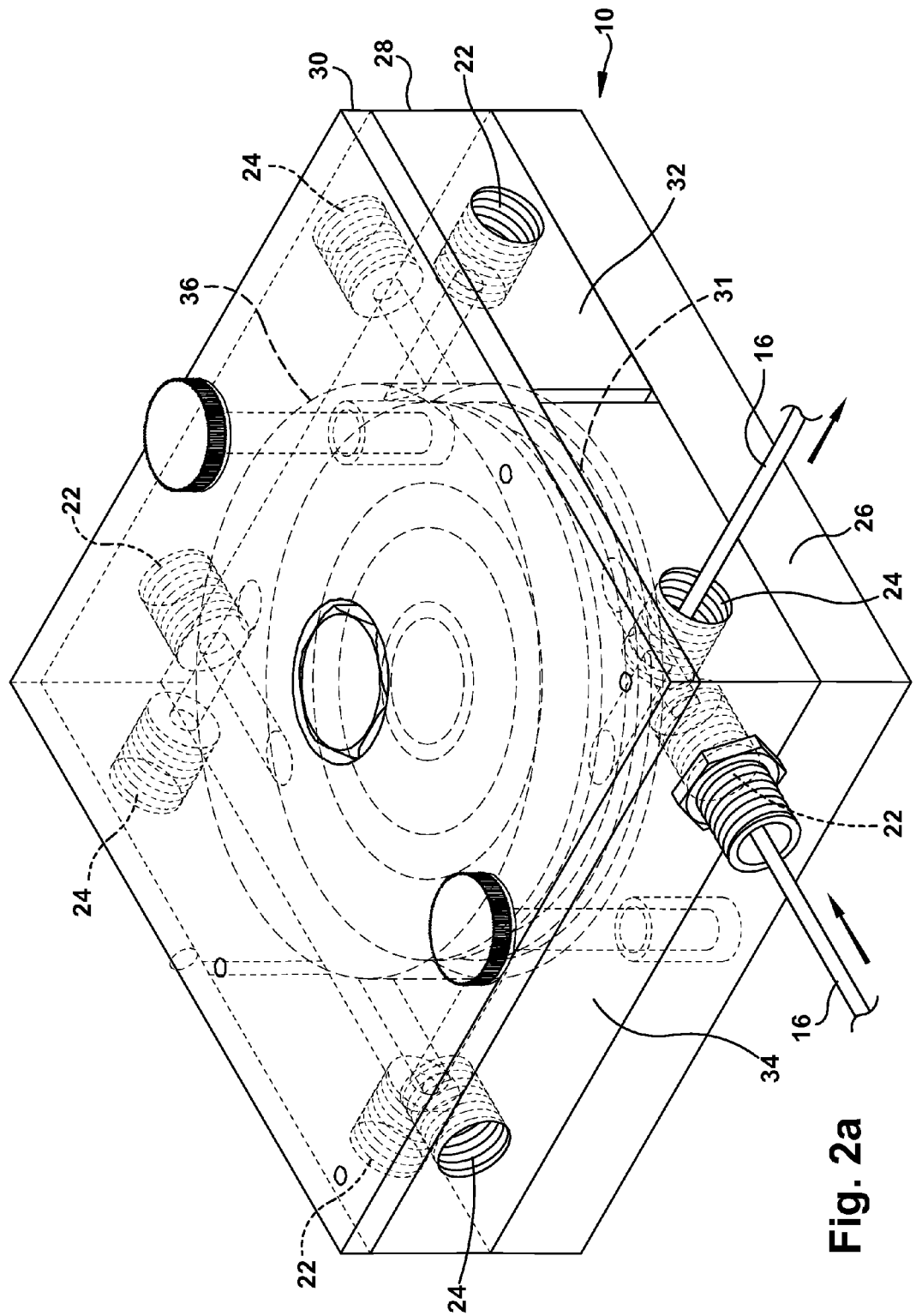
FIG. 2a is a perspective view of one embodiment of a wire isolator.

FIG. 2a illustrates an enlarged perspective view of wire isolator 10, illustrated in FIG. 1, having welding wire 16 feeding through a fitting (discussed below) and into inlet 22 and exiting wire isolator 10 from outlet 24 (internal components shown in ghost lines). In the illustrated embodiment, wire isolator 10 includes square back plate 26, front guide housing 28, and cover 30, and an appropriately-sized pulley 31, e.g., a four inch diameter, where at least a portion of the pulley engages the welding wire (further discussed below). The pulley is sized by a consideration of several factors known in the art, at least one of which is the diameter of the welding wire. The wire isolator can be made by machining, molding, or other processes known by one skilled in the art. In the illustrated embodiment, back plate 26, front guide housing 28, cover 30, and pulley 31 are preferably made from plastic materials so that wire isolator 10 may be an electrically nonconductive device. A non-limiting exemplary listing of plastic materials useful in the manufacture of these components includes thermoset resins, thermoplastic resins, and reinforced resins of either type. For example, back plate, front guide, cover, and pulley made from thermoplastics may be made from a non-exhaustive and non-limiting list that includes (meth)acrylics, celluloids, ethylene-vinyl acetate, flouroplastics, polyacrylates, polyamides, polybutylene, polycaprolactone, polycarbonate, polyethylene, polypropylene, and polyvinyl chloride. A non-exhaustive and exemplary list of thermosets includes vulcanized rubbers, melamine resin, polyimides, and fiberglass-filled polyesters as well as crosslinked thermoplastics. In another embodiment (not shown), back plate, front guide housing, and/or optional cover are made into another shape to hold at least one pulley or at least one wire engaging device, including but not limited to circular, rectangular, and the like.

Materials used to fabricate wire isolator 10 are made from materials designed to withstand forces transmitted to the wire isolator from the welding wire and may optionally be made from metal and wood materials. A non-exhaustive, exemplary list of metals includes carbon steel, stainless steel, aluminum, and copper; while a similar non-limiting exemplary list of wood materials includes hardwoods and softwoods, e.g., oak, pine, ash, cedar, buckeye, cherry, hickory, and maple.

In the illustrated embodiment, front guide housing 28 includes first guide portion 32 and second guide portion 34 and at least two apertures, including at least one inlet 22 and at least one outlet 24. First guide portion 32 and second guide portion 34 each include half circle cutouts (not shown) that form a substantially full circle cutout 36 when the two guide portions attach to the back plate. The full circle cutout 36 forms an opening where pulley 31 is pivotally and securely fastened to back plate 26. Back plate 26 may be securely fastened to first guide portion 32 and/or second guide portion 34. Cover 30 may be securely fastened to back plate 26 and/or at least one portion of front guide housing 28. In another embodiment (not shown), front guide housing may include more or less inlets and/or outlets than what is illustrated in FIG. 2. In the illustrated embodiment, wire isolator 10 prevents twisting from external welding wire from transmitting into the welding wire stored in the bulk wire container. As discussed above, twisting welding wire may lead to tangling and other undesirable conditions during welding wire payoff from the bulk container.

FIG. 2b illustrates a side view of wire isolator 10, illustrated in FIG. 2a, with interior portions and components illustrated in hidden lines. Inlet 22 includes outward facing surface 38, circular bore 40 (optionally threaded) having centerline CL1 offset from bottom of back plate 26 by first distance D1, laterally extending circular bore 42, and inward facing aperture 44, preferably a beveled elliptical aperture. Surface 38 and circular bore 40 are configured to receive a fitting (preferably with mating threads). Laterally extending circular bore 42 and inward facing aperture 44 are configured to guide welding wire to a pulley (shown in hidden lines). Outlet 24 includes outward facing surface 46, threaded circular bore 48 having centerline CL2 offset from bottom of back plate 26 by second distance D2, laterally extending circular bore 50, and inward facing aperture 52, preferably a beveled elliptical aperture. Inward facing aperture 52 and laterally extending circular bore 50 guide welding wire from the pulley to threaded circular bore 48 and outward facing surface 46, which is illustrated as having an optional threaded fitting. In the illustrated embodiment, first distance D1 and second distance D2 are not equal, therefore, the inlets and the outlets are on different parallel planes or the inlet has a first central longitudinal axis and the outlet has a second central longitudinal axis that is offset from the first axis, e.g., vertically and/or horizontally offset. In other words, the welding wire moves from a first plane to a second plane as the welding wire moves in wire isolator 10 from inlet 22 to outlet 24. In another embodiment (not shown), the inlets and the outlets are on the same or substantially the same plane, therefore, the welding wire travels less than three-hundred and sixty degrees or the pulley may include a groove having a spiral flight. In yet another embodiment (not shown), circular bores are curved and/or are at an angle relative to the centerlines of the inlet and/or the outlet. In another embodiment (not shown), the inlets and outlets are at least one of the following: non-threaded and non-circular. In yet another embodiment (not shown), inlets and/or outlets may include a fitting.

FIG. 2c illustrates a cross-sectional view of wire isolator illustrated in FIGS. 2a-2b taken along line 2c-2c shown in FIG. 2b. Wire isolator 10 is illustrated as having a fitting 75 securely attached to inlet 22. Welding wire 16 enters wire isolator 10 through inlet 22, engages pulley 31, also known as a wire engaging member, along at least a portion of a radially outer surface of the pulley, and exits wire isolator 10 through outlet 24. In other words, pulley 31 engages welding wire 16 and translates longitudinal axial movement of welding wire 16 moving through inlet 22 into circumferential tangential movement about pulley 31. The circumferential tangential movement translates back into longitudinal axial movement as welding wire 16 moving through outlet 24. As discussed further below, wire isolator 10 may be configured so welding wire 16 can engage another portion of pulley 31 and/or can enter and exit through other inlets and outlets.

Figure 3:
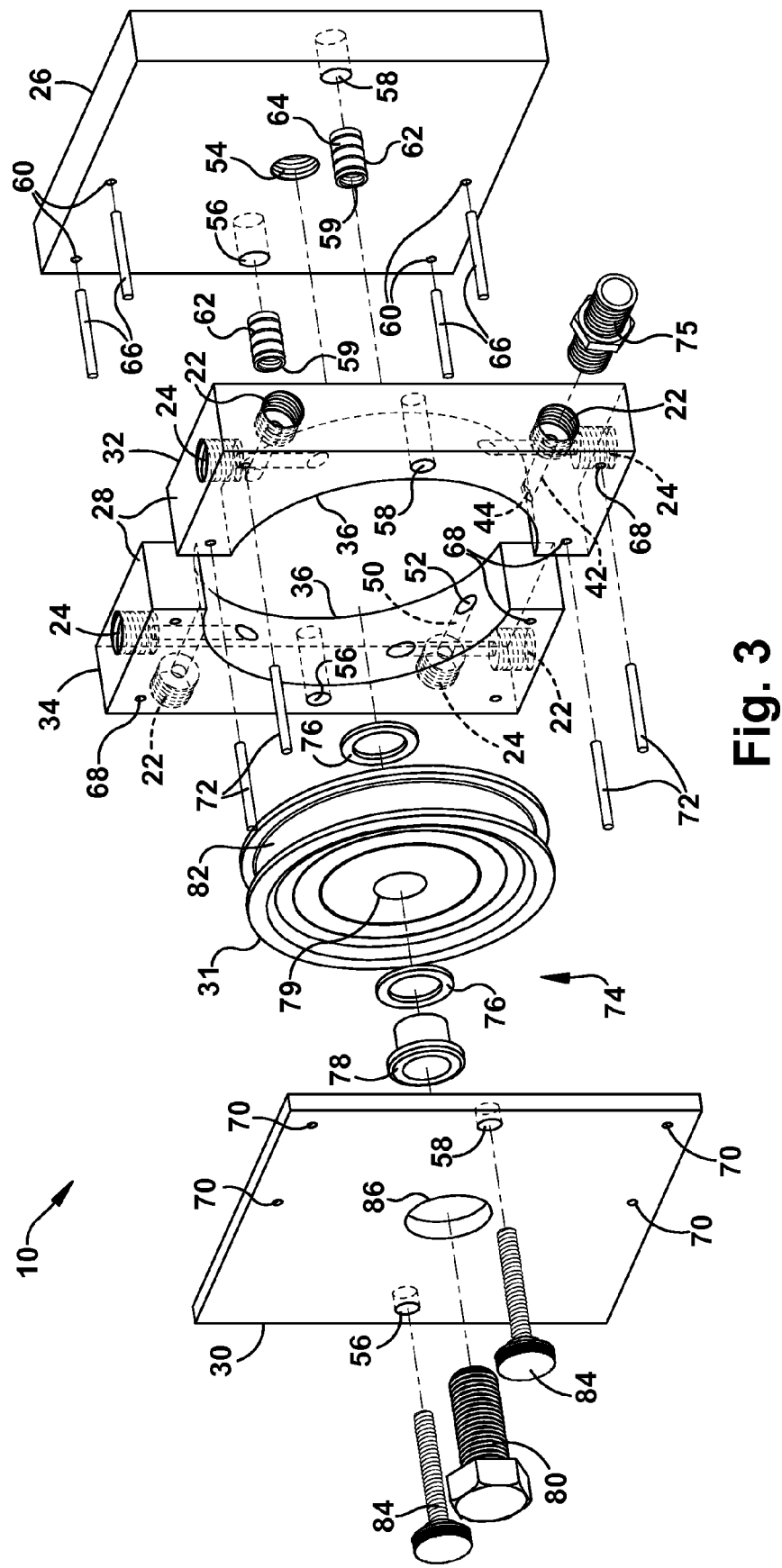

FIG. 3 illustrates an exploded assembly view of wire isolator 10 illustrated in FIGS. 2a-2c. Square back plate 26 includes first threaded hole 54, first thru-hole 56, second thru-hole 58, and a plurality of perimeter thru-holes 60. First threaded hole 54 includes threads configured to receive a fastener (discussed below) that securely attaches pulley 31 to back plate 26. In another embodiment (not shown), back plate does not include first threaded hole and back plate includes an upward extending post configured to securely mount and attach the pulley or a welding wire engaging member to the back plate. In the illustrated embodiment, first thru-hole 56 and second thru-hole 58 receive internally threaded inserts 59 that press into thru-holes 56 and 58. Internally threaded inserts 59 include a plurality of external fins 62 that securely attach each insert 59 in each thru-hole 56 and 58 when insert 59 receives a fastener. For example, the internal threads of each insert 59 are configured to securely receive and fasten the thumb screws (discussed below) to the wire isolator. In another embodiment, the thru-holes and inserts are threaded. In yet another embodiment, thru-holes may be threaded and the thumb screws may fasten directly to the back plate. In another embodiment, thru-holes may not be perimeter thru-holes, but may be in another location of the back plate. In the illustrated embodiment, plurality of perimeter thru-holes 60 are configured to receive pins 66 or fasteners that securely attach back plate 26 to at least one portion of front guide housing 28. Pins 66 may include at least one of the following: tapered pins, spring pins, roll pins, and the like. In another embodiment (not shown), perimeter thru-holes can be threaded and the back plate and at least one portion of front guide housing can be securely attached by a threaded fastener. In yet another embodiment (not shown), the back plate does not include thru holes, but may include at least two upward extending posts that securely engage thru holes in at least one portion of the front guide housing. In another embodiment, at least a portion of the front guide housing is an extension of the back plate (discussed below in FIG. 5), so pins or fasteners are not needed. In yet another embodiment, the wire isolator is assembled with bolts, washers, and nuts.

Figure 5:
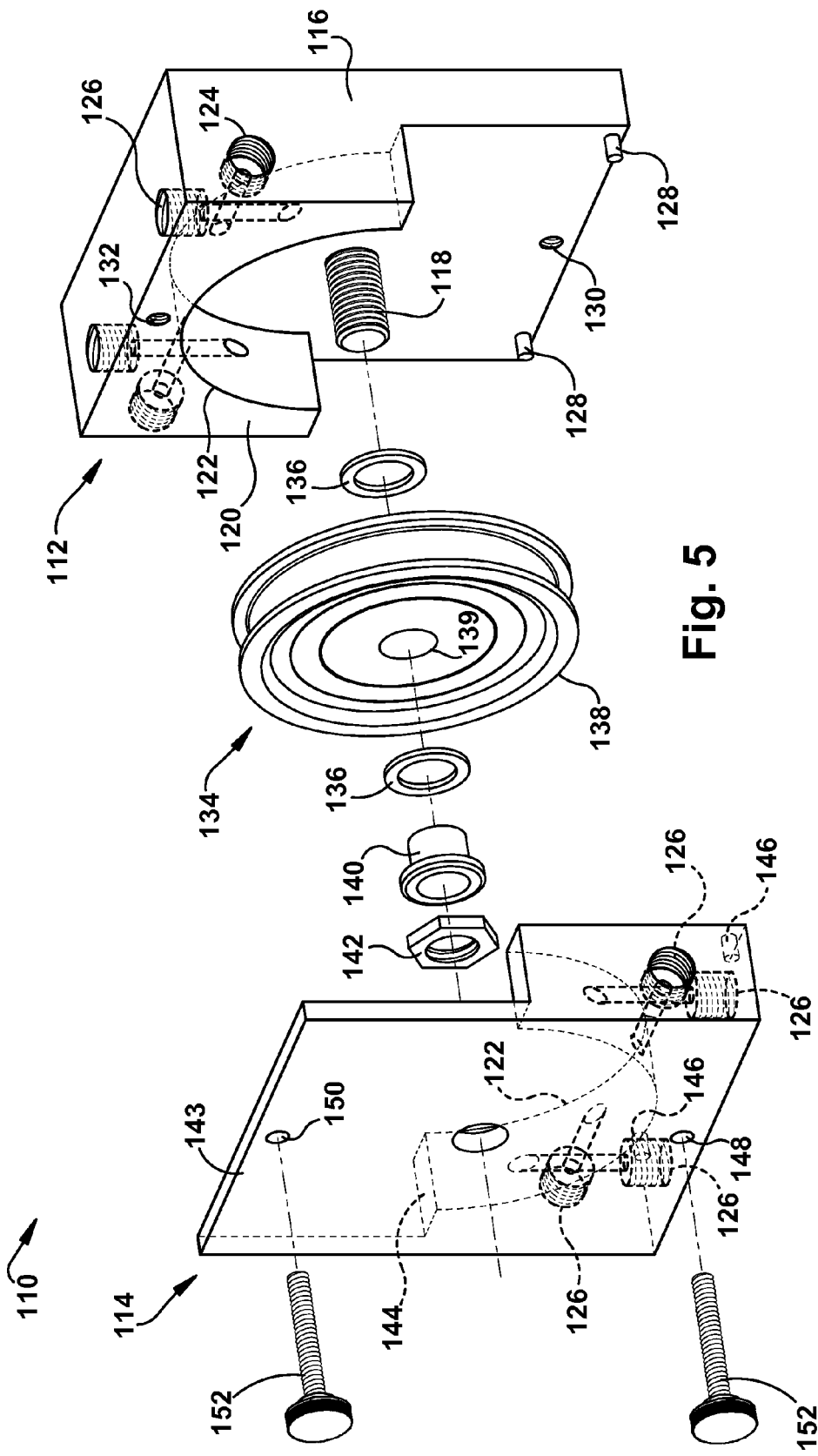
FIG. 5 is an exploded assembly view of an alternative wire isolator.

In the illustrated embodiment, front guide housings 28 are shown having two separate portions, first guide portion 32 and second guide portion 34, each having a rectangular shape with a half circle cutout 36 on an inward facing side. First guide portion 32 and second guide portion 34 of front guide housing 28 form circular cutouts that receive and surround pulley 31. In yet another embodiment (as shown in FIG. 5), front guide housing includes an integrally formed cover or shield. In another embodiment, front guide housing and back plate are integrally formed in one piece. In another embodiment (not shown), front guide housing is a single contiguous portion or has more than two portions.

In the illustrated embodiment, front guide housing 28 includes a plurality of perimeter thru-holes 68. At least one of the plurality of thru-holes 68 in first guide portion 32 aligns with at least one of the plurality of perimeter thru-holes 60 in back plate 26 and each further receive pin 66 that securely attaches back plate 26 to first guide portion 32. At least one of the plurality of thru-holes 68 in second guide portion 34 aligns with at least one of the plurality of perimeter thru-holes 70 in cover 30 and each further receive pin 72 that securely attaches first guide portion 34 to cover 30. Pins 72 may include at least one of the following: tapered pins, spring pins, roll pins, and the like. Further in the illustrated embodiment, front guide housing 28 includes first thru-hole 56 and second thru-hole 58 that aligns with first thru-hole 56 and second thru-hole 58, respectively, in back plate 26. In another embodiment, the front guide housing and the back plate do not include pins and are glued together. In yet another embodiment, at least the front guide housing and the back plate are molded as at least one piece, e.g., plastic injection molding.

In the illustrated embodiment, pipe fitting 75 may thread into inlet 22 and/or outlet 24 on one end and may thread into a quick connect (not shown) or some other style of connection that may connect to the cover of a bulk welding wire container (discussed above) or that may connect to a welding wire conduit that supplies welding wire to a welding system (both not shown). In another embodiment (not shown), wire isolator can include alternative fitting types, including but not limited to nipples, couplings, compression fittings, and the like. In yet another embodiment (not shown), wire isolator can include fittings that include male and/or female threads and/or threads only on one end. In another embodiment (not shown), the wire isolator can include more than one fitting.

Further illustrated in FIG. 3 is pulley assembly 74 that includes pulley 31, two washers 76, sleeve bearing 78, and cap screw 80. Pulley 31, washers 76, and sleeve bearing 78 each have centrally located apertures 79 or holes that are configured to receive cap screw 80. Pulley assembly 74 may be assembled by sliding the following components onto cap screw 80: washer 76, pulley 31, washer 76, and sleeve bearing 78, wherein sleeve bearing 78 slides through apertures 79 in washers 76 and pulley 31. Cap screw 80 securely attaches to back plate 26, and pulley 31 fits within the full circle cutout 36 formed by first guide portion 32 and second guide portion 34. In the illustrated embodiment, pulley 31 includes at least one circumferential groove 82 having a u-shaped cross section that is configured to slideably engage at least one diameter of welding wire. Welding wire (not shown) sits and/or slides in at least one groove 82 as welding wire (not shown) engages pulley 31 and moves through the wire isolator 10. In another embodiment (not shown), the groove has at least one of the following cross sections: v-shape, u-shaped wherein all sides are of equal or unequal length, semi-circular, and the like. In yet another embodiment (not shown), wire isolator includes more than one pulley. In another embodiment (not shown), wire isolator includes more than one pulley assembly. As discussed below, the pulley assembly may be replaced with another structure or assembly that the welding wire engages as it moves through the wire isolator.

In the illustrated embodiment, pulley 31, washers 76, sleeve bearing 78, and cap screw 80 are made from plastic materials identified previously. In another embodiment (not shown), the pulley may be made from wood or metal materials, including the non-exhaustive and non-limiting list of wood and metal materials discussed above. In yet another embodiment (not shown), washers, sleeve bearing, and cap screw may be made from metal materials identified previously.

In the illustrated embodiment, cover 30 includes first thru-hole 56 and second thru-hole 58 that are longitudinally aligned with thru-holes in front guide housing 28 and back plate 26. Thumb screws 84 pass through first thru-holes 56 and second thru-holes 58 in cover 30 and top guide 28 to securely engage with internal threads of insert 59, which securely assembles back plate 26, top guide 28, and cover 30. In another embodiment (not shown), back plate, top guide, and cover are assembled using other fasteners that are known to one skilled in the mechanical arts. In yet another embodiment (not shown), back plate, top guide, and cover are formed using other processes, e.g., plastic injection molding. In the illustrated embodiment, cover 30 includes a plurality of perimeter thru-holes 70 configured to securely attach cover 30 to front guide housing 28 (as discussed above). Further, cover 30 includes a centrally located hole 86 configured to provide access to cap screw 80 of pulley assembly 74.

FIGS. 4a-4f are top plan views of wire isolators with covers removed having welding wire 16 engaging at least a portion of pulley 31 in wire isolator 10. As discussed above, wire isolator 10 may include at least one inlet and at least one outlet. In the illustrated embodiments, the welding wire engages from 35 degrees to 1080 degrees of the pulley between a contact point and a takeoff point, more preferred from 90 degrees to 720 degrees, and most preferred from 180 degrees to 360 degrees. One skilled in the art would recognize that the listed ranges of welding wire engagement may vary plus or minus 25 degrees. Locations 88-102 represent a non-exhaustive and exemplary number of possible locations for at least one inlet and at least one outlet where welding wire 16 may enter and exit wire isolator 10. As discussed above, welding wire 16 engagement of at least a portion of pulley 31 may prevent or minimize the level of twisting that transmits into the bulk welding wire from incoming welding wire. In other words, the wire isolator creates a standing loop in the wire that prevents rotational energy from transferring from the feed path to the wire stored in the bulk wire container. In another embodiment, the wire isolator creates a partial standing loop in the wire that prevents at least a portion of the rotational energy from transferring from the feed path to the wire stored in the bulk wire container.

Figure 4:
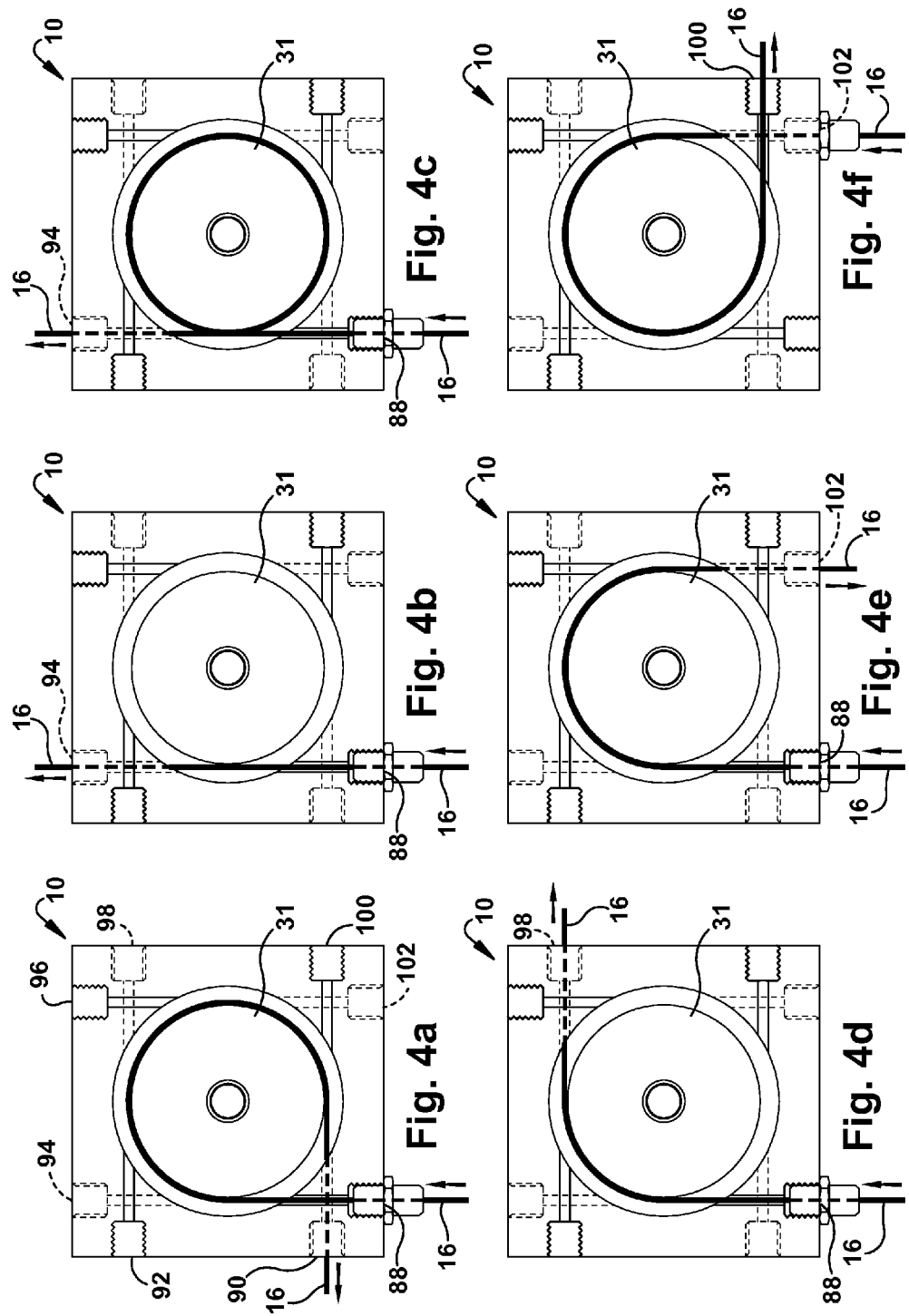
FIGS. 4a-4f are top plan views of wire isolators with covers removed having welding wire engaging at least a portion of a pulley in each wire isolator.

In FIG. 4a, welding wire 16 enters wire isolator at inlet location 88, engages a substantial portion of an outer radial groove of pulley 31, and exits wire isolator 10 at outlet location 90. In FIG. 4b, welding wire 16 enters wire isolator at inlet location 88, engages a portion of an outer radial groove of pulley 31, and exits wire isolator 10 at outlet location 94. In FIG. 4c, welding wire 16 enters wire isolator at inlet location 88, engages the entire outer radial groove of pulley 31, and exits wire isolator 10 at outlet location 94. In FIG. 4d, welding wire 16 enters wire isolator at inlet location 88, engages at least ninety degrees of an outer radial groove of pulley 31, and exits wire isolator 10 at outlet location 98. In FIG. 4e, welding wire 16 enters wire isolator at inlet location 88, engages about one-hundred and eighty degrees of an outer radial groove of pulley 31, and exits wire isolator 10 at outlet location 102. In FIG. 4f, welding wire 16 enters wire isolator at inlet location 102, engages an outer radial groove of pulley 31, and exits wire isolator 10 at outlet location 100. FIGS. 4a-4f should not be construed to limit the number, arrangement, orientation, or location of inlets and outlets in the wire isolator or the degree or amount of engagement between the pulley and the welding wire. In FIGS. 4a, 4c, and 4f, for example, the inlet and outlet apertures may need to be offset, e.g., vertically offset, when the incoming and exiting welding wire cross paths (when viewed from above) so the incoming and exiting portions of the welding wire do not make contact. In another embodiment, the inlet and/or the outlet aperture may include an offset tubing that prevents the incoming and exiting welding wire from making contact.

FIG. 5 illustrates an exploded assembly view of an alternative wire isolator 110 that is similar to wire isolator 10 discussed above, including materials and wire isolator function, except wire isolator 110 is made from a different number of parts than wire isolator 10 illustrated in FIG. 3. Wire isolator 110 includes lower housing portion 112 and upper housing portion 114. Lower housing portion 112 includes back plate 116 having an upward extending threaded post 118, first guide portion 120 having half circle cutout 122, at least one threaded inlet 124, at least one threaded outlet 126, at least two upward extending alignment posts 128, and threaded holes 130 and 132. In another embodiment, inlet, outlet, and/or holes may not be threaded, but may be configured to have another fastening configuration.

In the illustrated embodiment, wire isolator 110 further includes pulley assembly 134, including washers 136, pulley 138 having a circumferential groove 139, and sleeve bearing 140. Pulley assembly 134 slideably engages upward extending post 118 and threaded nut 142 securely attaches pulley assembly 134 to threaded post 118. In another embodiment (discussed below), upward extending post does not include threads, but includes a laterally extending hole at an upper end configured to receive a fastener, e.g., a cotter pin, that securely attaches pulley assembly or a welding wire engaging member to the post. In another embodiment (not shown), upward extending post includes a self-locking feature that securely attaches the pulley to the post without the need for a fastener. In the illustrated embodiment, upper housing portion 114 includes cover portion 143 and second guide portion 144 having half circle cutout 122 that aligns with first guide portion 120 to form a complete circle cutout. Upper housing portion 114 further includes upward extending cylindrical cavities 146 configured to receive upward extending alignment posts 128 from lower housing portion 112. Further, upper housing portion 114 include holes 148 and 150 that receive thumb screws 152 that insert into and securely engage threaded holes 130 and 132 in lower housing portion 112. In another embodiment (not shown), the upper portion may only include a cover portion and the lower portion may include an entire guide portion having a complete circular cutout or a substantial portion thereof. In another embodiment (not shown), the upper portion includes a downward extending post configured to securely engage a pulley assembly or a welding wire engaging member.

FIG. 6 illustrates a top plan view of a wire isolator having a roller bearing assembly 154 that may be installed in the wire isolator to replace the pulley assembly discussed above. In the illustrated embodiment, roller bearing assembly 154 includes at least one roller bearing 156, wherein the at least one roller bearing forms a circular configuration and welding wire 158 engages at least one roller bearing 158. In the illustrated embodiment, the roller bearings 156 are ball bearings and are securely attached to the back plate. In another embodiment (not shown), the roller bearings can include needle bearings, tapered roller bearings, spherical roller bearings, thrust bearings, and the like.

FIG. 7 illustrates a top plan view of a wire isolator having a fixed circular shaft 160 that upwardly extends from the back plate of the wire isolator to replace the pulley assembly discussed above. In the illustrated embodiment, fixed circular shaft 160 is made from a wear resistant material that allows movement of welding wire 158. In another embodiment (not shown), fixed circular shaft includes a circumferential groove that guides the welding wire. In yet another embodiment (not shown), fixed circular shaft includes a replaceable circumferential groove. In another embodiment (not shown), fixed circular shaft is securely attached to the back plate. In yet another embodiment (not shown), more than one fixed shaft upwardly extends from the back plate of the wire isolator to form a circular configuration that allows movement of welding wire.

FIG. 8 is a perspective view of an alternative wire isolator 162. Wire isolator 162 includes square base plate 164 having at least one upward extending square post 166 and an upward extending circular shaft 168. Upward extending square post 166 includes threaded inlet 170 and threaded outlet 172 that are configured to feed welding wire 174 into and out, respectively, of wire isolator 162. In another embodiment (not shown), wire isolator may include more than one upward extending post or the post may have another cross-section or configuration, including but not limited to an oval cross-section or an angle-shaped configuration. In the illustrated embodiment, wire isolator 162 includes pulley 176 that is securely attached to upward extending circular shaft 168 by cotter pin 178 that securely attaches to upward extending circular shaft 168 through laterally extending hole 180. In another embodiment (not shown), upward extending circular shaft includes laterally extending threads and a threaded fastener securely attaches pulley to the post. In the illustrated embodiment, wire isolator 162 includes a clear cover 182 that removeably attaches to the upward extending post 166 or another portion of the wire isolator in at least one location.

In the illustrated embodiment, square base plate 164, pulley 176, and cover 182 are made from plastic materials identified previously. In another embodiment (not shown), wire isolator, pulley, and/or cover may be made from wood or metal materials, including the non-exhaustive and non-limiting list of wood and metal materials discussed above.

Figure 9:
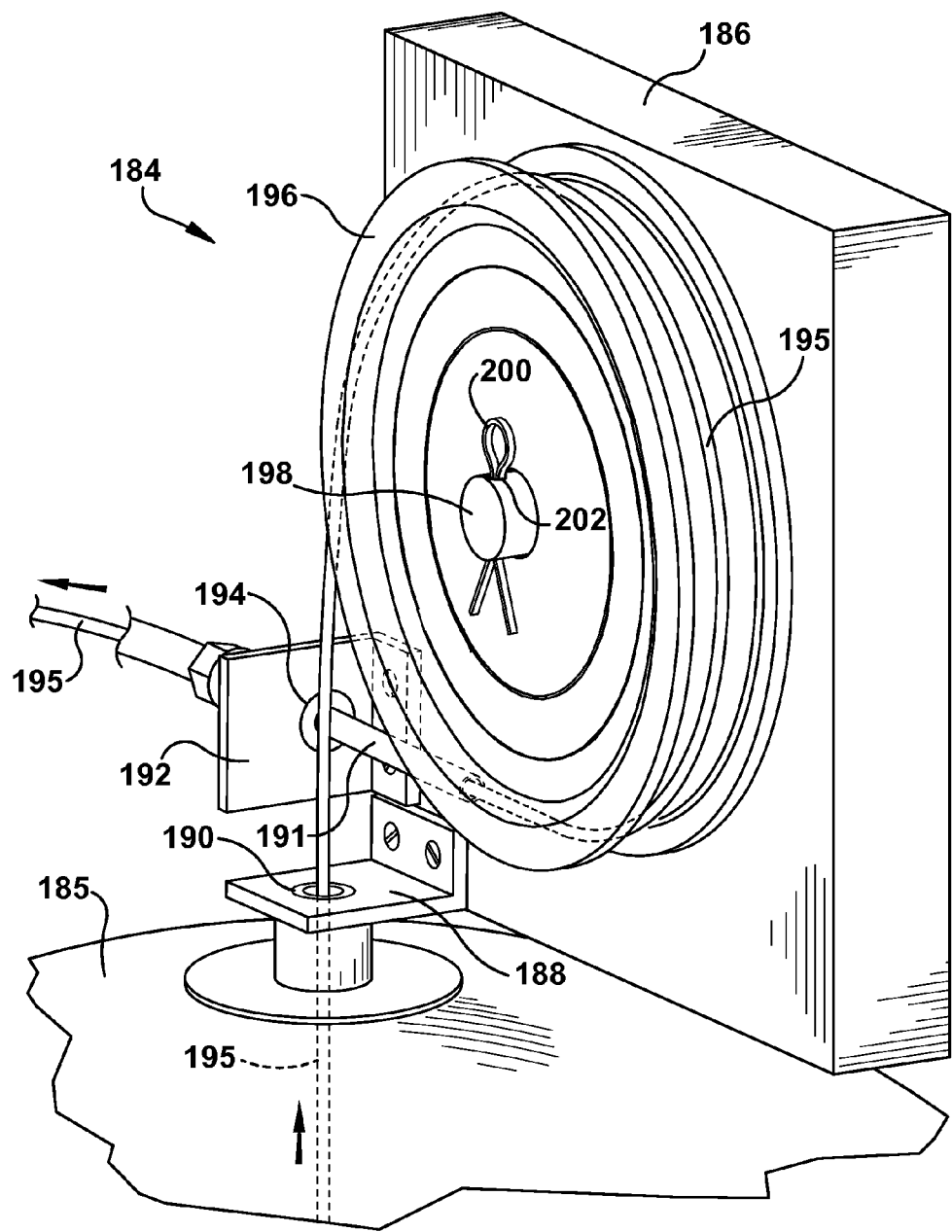
FIG. 9 is a perspective view of another alternative wire isolator.

FIG. 9 is a perspective view of an alternative wire isolator 184 attached to a dome shaped cover 185 on a drum or box bulk wire container (not shown). Wire isolator 184 includes at least one part, including square base plate 186, upward extending first angle bracket 188 having threaded inlet 190, circular tubing 191, and upward extending second angle bracket 192 having threaded outlet 194. Threaded inlet 190 and threaded outlet 194 are configured to feed welding wire 195 in and out, respectively, of wire isolator 184. Circular tubing 191 is offset and guards outgoing welding wire from incoming welding wire. As discussed above, the axes of threaded inlet 190 and threaded outlet 194 may be offset. In another embodiment (not shown), upward extending first angle bracket having threaded inlet and upward extending second angle bracket having threaded outlet may be positioned at another location of square base plate. In the illustrated embodiment, wire isolator 184 includes pulley 196 that is securely attached to upward extending circular shaft 198 by cotter pin 200 that securely attaches to upward extending circular shaft 198 through laterally extending hole 202. In another embodiment (not shown), upward extending circular shaft includes laterally extending threads and a threaded fastener that securely attaches pulley to the post. In yet another embodiment (not shown), the pulley is fastened with a cap screw that is securely attached to the base plate. In another embodiment, wire isolator includes a clear cover that removeably attaches to the upward extending first and second angle brackets or another portion of the wire isolator in at least one location. In the illustrated embodiment, square base plate 186, pulley 196, and brackets 188 and 192 are made from plastic, metal, or wood materials identified previously.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. An apparatus comprising:
a bulk wire container comprising coiled wire;
a wire isolator comprising:
  a back plate having a shaft extending normal to a horizontal inner surface of the back plate, an apertured front housing having an opening for a pulley within the front housing and positioned upon the horizontal inner surface of the back plate, the shaft extending from the back plate extending into the opening for engagement with a pulley aperture, and a cover positioned upon an inner surface of the front housing;
  an attachment means to said bulk wire container;
  an inlet for said wire isolator wherein said inlet has a first central longitudinal axis;
  an outlet for said wire isolator wherein said outlet has a second central longitudinal axis parallel to the first central longitudinal axis;
  wherein said first central longitudinal axis and said second central longitudinal axis are offset relative to each other within said apertured front housing; and
  further wherein the pulley translates longitudinal axial movement of said wire in said inlet into circumferential tangential movement about said pulley, interposed between said inlet and said outlet.

2. The apparatus of claim 1, wherein
said wire circumferentially translates about said pulley between a contact point and a takeoff point from 35 degrees and 1080 degrees.

3. The apparatus of claim 1, wherein
said wire circumferentially translates about said pulley between a contact point and a takeoff point from 180 degrees and 360 degrees.

4. The apparatus of claim 1, wherein
said attachment means to said bulk wire container includes a fitting that attaches to said bulk wire container and said inlet.

5. An assembly comprising:
a bulk wire container comprising coiled wire;
at least one isolator comprising:
  a back plate having a shaft extending normal to a horizontal inner surface of the back plate, a front housing having a centrally disposed opening for a pulley within the front housing, the front housing positioned upon the horizontal inner surface of the back plate, the shaft extending from the back plate extending into the opening for engagement with a pulley aperture, the front housing having at least four openings disposed therein, and a cover positioned upon an inner surface of the front housing;
  an attachment means to said bulk wire container;
  at least two pairs of inlets and outlets for said at least one isolator wherein each of said inlets has a first central longitudinal axis and each of said outlets has a second central longitudinal axis parallel to the first central longitudinal axis;
  wherein said first central longitudinal axis and said second central longitudinal axis are offset relative to each other within said front housing; and
  a pulley which circumferentially translates said wire from any of said inlets to any of said outlets.

6. The assembly of claim 5, wherein
each pulley includes a circumferential groove, and wherein said wire is engaged in at least one location of the circumferential groove.

7. The assembly of claim 5, wherein
said wire circumferentially translates about said pulley between a contact point and a takeoff point from 35 degrees and 1080 degrees.

8. The assembly of claim 7, wherein
said wire circumferentially translates about said pulley between a contact point and a takeoff point from 180 degrees and 360 degrees.

* * * * *